(12) United States Patent
Panda et al.

(10) Patent No.: US 12,499,332 B2
(45) Date of Patent: Dec. 16, 2025

(54) TRANSLATING TEXT USING GENERATED VISUAL REPRESENTATIONS AND ARTIFICIAL INTELLIGENCE

(71) Applicants: International Business Machines Corporation, Armonk, NY (US); Massachusetts Institute of Technology, Cambridge, MA (US)

(72) Inventors: Rameswar Panda, Cambridge, MA (US); Yi Li, Cambridge, MA (US); Richard Chen, Yorktown Heights, NY (US); Rogerio Schmidt Feris, Yorktown Heights, NY (US); Yoon Hyung Kim, Cambridge, MA (US); David Cox, Cambridge, MA (US)

(73) Assignees: International Business Machines Corporation, Armonk, NY (US); Massachusetts Institute of Technology, Cambridge, MA (US)

( * ) Notice: Subject to any disclaimer, the term of this patent is extended or adjusted under 35 U.S.C. 154(b) by 423 days.

(21) Appl. No.: 17/954,845

(22) Filed: Sep. 28, 2022

(65) Prior Publication Data

US 2024/0127005 A1    Apr. 18, 2024

(51) Int. Cl.
  *G06F 40/58*    (2020.01)
  *G06F 40/284*    (2020.01)
(52) U.S. Cl.
  CPC ........... *G06F 40/58* (2020.01); *G06F 40/284* (2020.01)
(58) Field of Classification Search
  CPC ....... G06F 40/58; G06F 40/284; G06N 3/044; G06N 3/08; G06N 3/045
  See application file for complete search history.

(56) References Cited

U.S. PATENT DOCUMENTS

| 10,902,952 B2 | 1/2021 | Lucas et al. |
| 2018/0137551 A1* | 5/2018 | Zheng .................. G06F 18/214 |

(Continued)

FOREIGN PATENT DOCUMENTS

| CN | 112257459 A | * | 1/2021 | ............. G06F 40/42 |
| CN | 112257465 A | * | 1/2021 | ............. G06F 40/58 |

OTHER PUBLICATIONS

Chen, Jiacheng, et al. "Learning the best pooling strategy for visual semantic embedding." Proceedings of the IEEE/CVF conference on computer vision and pattern recognition. 2021. https://arxiv.org/abs/2011.04305 (Year: 2021).*

(Continued)

*Primary Examiner* — Pierre Louis Desir
*Assistant Examiner* — Keisha Y. Castillo-Torres
(74) *Attorney, Agent, or Firm* — Ryan, Mason & Lewis, LLP (57) ABSTRACT

Methods, systems, and computer program products for translating text using generated visual representations and artificial intelligence are provided herein. A computer-implemented method includes generating a tokenized form of at least a portion of input text in a first language; generating at least one visual representation of at least a portion of the input text using a first set of artificial intelligence techniques; generating a tokenized form of at least a portion of the at least one visual representation; and generating an output including a translated version of the input text into at least a second language by processing, using a second set of artificial intelligence techniques, at least a portion of the tokenized form of the at least a portion of the input text and at least a portion of the tokenized form of the at least a portion of the at least one visual representation.

19 Claims, 4 Drawing Sheets

(56) References Cited

U.S. PATENT DOCUMENTS

| | | | |
|---|---|---|---|
| 2019/0191044 A1* | 6/2019 | Ghodke | H04N 1/00498 |
| 2020/0126663 A1 | 4/2020 | Lucas et al. | |
| 2021/0272341 A1* | 9/2021 | Swaminathan | G06T 7/70 |
| 2022/0108685 A1 | 4/2022 | Petrov et al. | |
| 2024/0104312 A1* | 3/2024 | Stone | G06N 3/045 |
| 2024/0338535 A1* | 10/2024 | Sung | G06F 40/58 |

OTHER PUBLICATIONS

Li et al., VALHALLA: Visual Hallucination for Machine Translation, May 31, 2022.
Li et al., VALHALLA: Visual Hallucination for Machine Translation Supplemental Material, 2022.
Raunak et al., The Curious Case of Hallucinations in Neural Network Machine Translation, Jun. 2021.
Zhou et al., Detecting Hallucinated Content in Conditional Neural Sequence Generation, Jun. 2021.
IP.com, IPCOM000265154D, System and Method for Automated Evaluation and Reconciliation of Regulatory Texts, Mar. 2021.
IP.com, IPCOM000262813D, AI Assistance Interaction with Visual Simulation on Edge Devices, Jul. 2020.
IP.com, IPCOM000259537D, Automatic Acquisition of Large Annotated Training Corpora for Automated Test Generation and Summarization, Aug. 2019.
Nyberg et al., The KANT system: Fast, accurate, high-quality translation in practical domains. In COLING 1992 vol. 3: The 14th International Conference on Computational Linguistics, 1992.
Lopez, A. Statistical machine translation. ACM Computing Surveys (CSUR), 40(3):1-49, 2008.
Bahdanau et al., Neural machine translation by jointly learning to align and translate. arXiv preprint arXiv:1409.0473, 2014.
Sutskever et al., Sequence to Sequence Learning with Neural Networks. In Proceedings ofNeurIPS, 2014.
Calixto et al., Doubly-attentive decoder for multi-modal neural machine translation. arXivpreprint arXiv:1702.01287, 2017.
In et al., Dynamic context-guided capsule network for multimodal machine translation. In Proceedings of the 28th ACM International Conference onMultimedia, pp. 1320-1329, 2020.
Ive et al., Distilling translations with visual awareness. arXiv preprintarXiv:1906.07701, 2019.

* cited by examiner

TRANSLATING TEXT USING GENERATED VISUAL REPRESENTATIONS AND ARTIFICIAL INTELLIGENCE

BACKGROUND

The present application generally relates to information technology and, more particularly, to language data processing. More specifically, translation systems face many challenges. For example, conventional translation approaches typically require paired text and image as inputs during inference, which significantly limits applicability to real-world scenarios.

SUMMARY

In at least one embodiment, techniques for translating text using generated visual representations and artificial intelligence are provided. An example computer-implemented method includes generating a tokenized form of at least a portion of input text, wherein the input text is in a first language, and generating at least one visual representation of at least a portion of the input text by processing the input text using a first set of one or more artificial intelligence techniques. Additionally, the method includes generating a tokenized form of at least a portion of the at least one visual representation, and generating an output including a translated version of the input text into at least a second language by processing, using a second set of one or more artificial intelligence techniques, at least a portion of the tokenized form of the at least a portion of the input text and at least a portion of the tokenized form of the at least a portion of the at least one visual representation.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes a multimodal machine translation framework which incorporates images at training time to produce an enhanced text-only model for machine translation. In such an embodiment, artificial intelligence techniques such as, for example, long short-term memory (LSTM) and one or more transformers are used for machine translation tasks. Additionally, such an embodiment includes training a model which is provided only with source sentences at test and/or inference time. However, in such an embodiment, during training, the model is trained to complement the text representation extracted from the source sentence(s) with a latent visual representation that mirrors a visual representation extracted from a real image (paired with the source sentence) by a multimodal machine translation (MMT) system (also referred to herein simply as a multimodal translation system). As detailed herein, such an embodiment includes training at least one autoregressive visual representation transformer over a discrete codebook (e.g., learned using VQGAN-VAE) to predict visual tokens from the input source sentence(s) for multimodal translation. As used herein, vector quantized variational autoencoder (VQVAE) refers to an approach to learn discrete representations of images and model their distribution autoregressively with a convolutional architecture, and VQGAN-VAE is an extension of VQVAE that uses a discriminator and perceptual loss to maintain perceptual quality at an increased compression rate.

One or more embodiments includes implementing multiple transformers. Such transformers can include a visual transformer that maps at least one source sentence into at least one discrete image representation, and an MMT transformer that maps the source sentence(s) paired with its discrete image representation(s) into the target sentence(s). Such transformer models can be trained, for example, with a combination of generated image data loss-related techniques, translation data loss-related techniques, and consistency loss-related techniques. In such an embodiment, the combination of losses helps in translating a source sentence to a target sentence while encouraging consistency between predictions using either ground-truth or generated visual representations, which facilitates reliable performance at inference time.

As further detailed herein, given a source sentence, an autoregressive transformer is used to predict a discrete visual representation from the input text, and the combined text and visual representation are utilized to obtain a target translation. Such an embodiment includes training the autoregressive transformer jointly with an MMT translation transformer (also referred to herein simply as a multimodal translation transformer) using backpropagation techniques with cross-entropy losses while being guided by an additional loss that encourages consistency between predictions using ground truth and/or generated visual representations.

Accordingly, in one or more embodiments, the ability to imagine and/or generate visual representations can be leveraged to improve machine translation systems. Further, in such an embodiment, a translation system with access to images at training time can be taught to abstract a visual representation of a text sentence in order to ground the translation process. At test time, this abstracted visual representation can be used in lieu of an actual image to perform multimodal translation.

As sampling of the discrete visual representations is non-differentiable, one or more embodiments include relying on a Gumbel-Softmax relaxation to effectively train an autoregressive transformer jointly with an MMT translation transformer. Discrete visual representation can render a transformer framework non-differentiable and therefore difficult to optimize via backpropagation. Accordingly, one or more embodiments include adopting Gumbel-Softmax sampling techniques to resolve such non-differentiability and enable direct optimization of the transformers in an efficient way. In particular, a Gumbel-Softmax relaxation can substitute the original non-differentiable sample from a discrete distribution with a differentiable sample from a corresponding Gumbel-Softmax distribution.

Accordingly, at least one embodiment may provide a beneficial effect such as, for example, improving text-based machine translations via the use of generated abstracted visual representations associated with input text.

Figure 1:
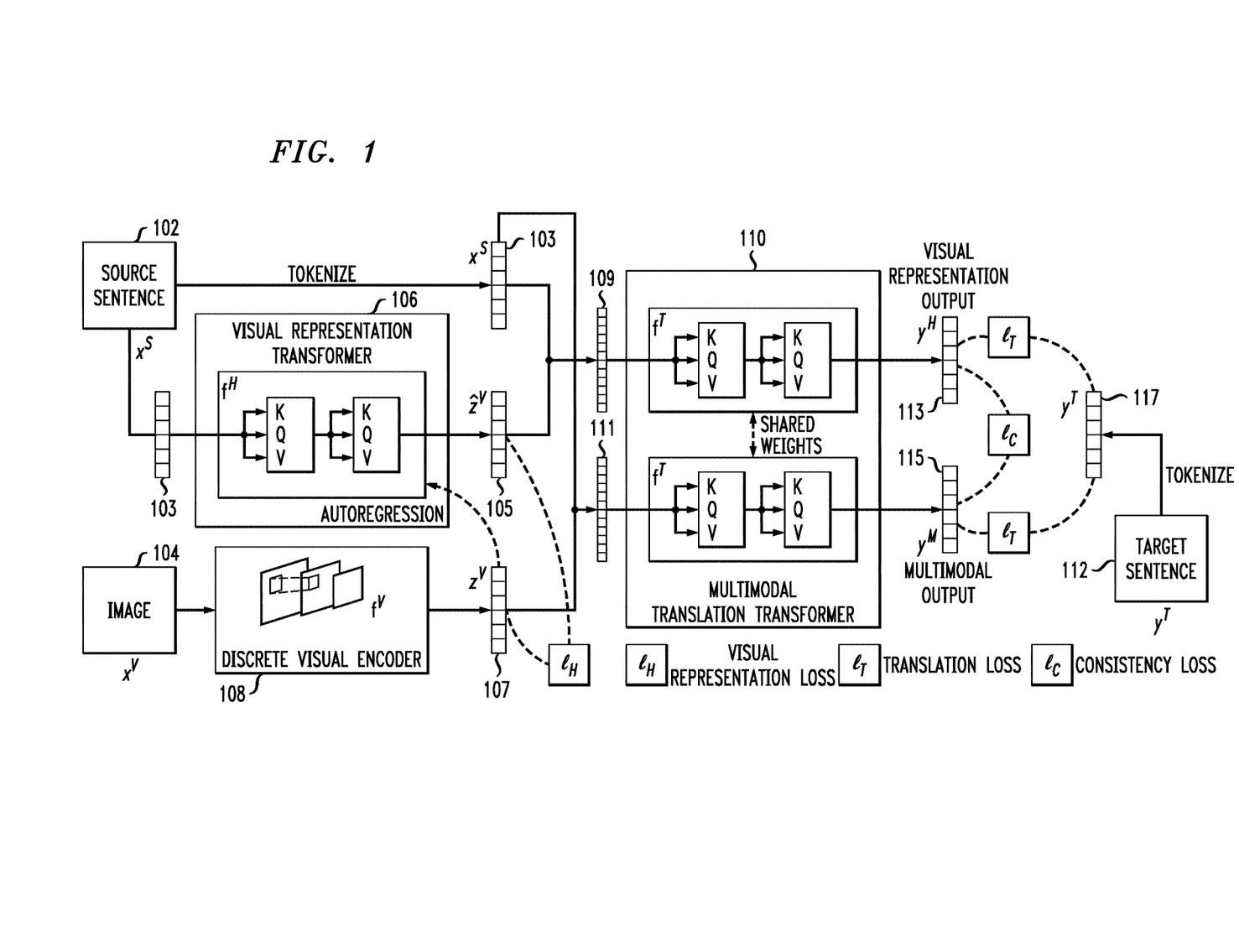
FIG. 1 is a diagram illustrating example architecture for training a multimodal translation system, according to an example embodiment of the invention.

FIG. 1 is a diagram illustrating example architecture for training a machine translation system, according to an example embodiment of the invention. By way of illustration, and as further detailed below, FIG. 1 depicts a visual representation transformer ($f_H$) 106 (e.g., a neural network module) that predicts and generates visual representation-based tokens 105 by processing a source sentence 102, a discrete visual encoder ($f_V$) 108 (e.g., a neural network module) for mapping an input image 104 into one or more sequences of ground-truth visual tokens 107, and a multimodal translation transformer ($f_T$) 110 (e.g., a neural network module) that predicts a target sentence 112 (which can be tokenized into tokens 117) from the concatenated sequences of text, a visual representation output 113, and a multimodal output 115, generated at least in part by processing the combinations of text and visual tokens 109 and 111. Additionally, as depicted in transformers 106 and 110, K, Q, V represent "key," "query," and "value," respectively.

Translation outputs are gathered from multiple streams of input, including text-based tokens 103 derived from source sentence 102, ground-truth visual tokens 107 (detailed further herein as "z") and visual representation-based tokens 105 (detailed further herein as "ẑ"), and optimized on a combination of visual representation loss ($l_H$), translation loss ($l_T$), and consistency loss ($l_C$). During training, wherein input sentence-image pairs (x, v) are available, the translation output is predicted through two streams: a multimodal output 115 and a visual representation output 113. The former uses ground-truth (discrete) visual tokens 107 (z) extracted from the input image 104 ($x^V$), while the latter uses visual representation-based tokens 105 (ẑ) generated based on source sentence 102 ($x^S$). This produces two distributions (detailed further herein as "$y^M$" and "$y^H$," respectively) which are trained against a target sequence y with a corresponding cross-entropy loss. Training losses also encourage consistency between predictions using ground truth and/or visual representations, which results in reliable performance of at inference time.

Figure 2:
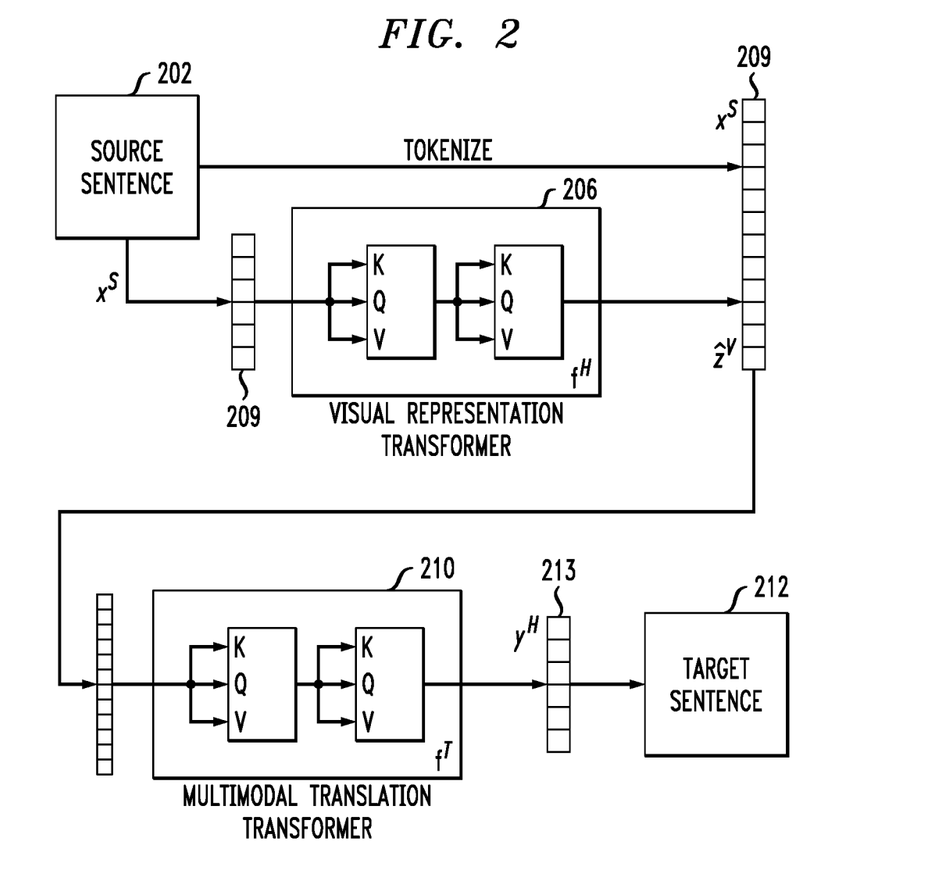
FIG. 2 is a diagram illustrating example architecture for testing a multimodal translation system, according to an example embodiment of the invention.

FIG. 2 is a diagram illustrating example architecture for testing (also referred to as inference) a machine translation system, according to an example embodiment of the invention. By way of illustration, FIG. 2 depicts a translation process wherein no images are provided as input at test/inference time in connection with a source sentence 202 ($x^S$). Accordingly, at inference time, as depicted in FIG. 2, visual representation transformer 206 processes source sentence 202 and generates a tokenized visual representation (corresponding to the content of source sentence 202) which is combined with a tokenized version of the source sentence 202 to form tokenized element 209. Tokenized element 209 is then processed by multimodal translation transformer 210 to generate pseudo-visual tokens 213, conditioned on the unimodal text input x alone, which are used to generate the translation output in the form of target sentence 212.

As detailed herein, given a corpus of source sentences $x \in X$ and visual context $v \in V$, typically images, one or more embodiments include training a machine translation system that can translate a source sentence x into a sentence $y \in Y$ in a target language without requiring images at inference time. Such a machine translation system can include, by way of example, an encoder-decoder framework with attention. Given sequence pairs (x, y), wherein $x=(x_1, \ldots, x_S)$ is the source sentence of length S, and $y=(y_1, \ldots, y_T)$ is the target sentence of length T, a transformer $f_T=(f_T^{enc}, f_T^{dec})$ models the likelihood of target tokens conditioned on the input sequence as:

$$p(y|x; f_T) = \prod_{i=1}^{T} f_T(y_i|y_{<i}, x) \triangleq \prod_{i=1}^{T} f_T^{dec}(y_i|y_{<i}, f_T^{enc}(x))$$

wherein the decoder $f_T^{dec}$ predicts the probability of output tokens at each location i by attending to encoder output $f_T^{enc}(x)$ and previous target tokens $y_{<i}$ using a cascade of attention layers. In such an embodiment, $f_T$ is trained by minimizing the cross-entropy loss as follows:

$$\ell_T(f_T) = \mathbb{E}_{(x,y)}[-\log p(y|x;f_T)]$$

In at least one embodiment, an MMT system can be implemented which considers a visual input v as a complementary information source for machine translation. Such an MMT system can include using an encoder $f_V$ to map an image into a latent visual representation $z=f_V(v)$, which is fed into a modified decoder (e.g., by concatenating z with the word embeddings of x) to obtain the probabilities conditioned on visual input, $$p(y|x, z; f_T) = \prod_{i=1}^{T} f_T(y_i|y_{<1}, x, z)$$

Additionally, in such an embodiment, MMT models can be trained on a dataset of triplets (x, v, y) by optimizing a translation loss based on cross-entropy as follows:

$$\ell_T(f_T;z) = \mathbb{E}_{(x,y)}[-\log p(y|x,z;f_T)]$$

As detailed herein, one or more embodiments include discrete visual encoding. An MMT can be implemented by combining text input with continuous visual embeddings, such as convolutional features extracted from a pretrained network (e.g., ResNet). However, one or more embodiments include using a discrete visual encoder which has multiple advantages over a continuous embedding. For example, images embedded into a sequence of discrete tokens can be concatenated with textual inputs (discrete word embeddings) into a multimodal sequence, which can then be processed by a single universal transformer to produce translation outputs.

Accordingly, one or more embodiments include using discrete visual token sequences, which can include raster-scanned vector quantization maps of input images with respect to a feature codebook learned from training images. Such an embodiment includes implementing vector quantization with a VQGAN-VAE model, using a visual encoder $f_V$ to map an input image v into a token sequence as:

$$z = Q(f_V(v); E_V)$$

Here $z=[z_1, \ldots, z_V]$ is a grid of discrete tokens laid out as a sequence, wherein $z_i \in \{1, \ldots, K\}$, $E_V = \{e^{(k)}\}_{k=1}^K$ are the d-dimensional visual codebook of size K, and Q denotes the quantization function:

$$Q_i(c; E_V) = \arg\min_{k \in \{1, \ldots, K\}} \|c_i - e^{(k)}\|_2$$

that maps each spatial location $i \in \{1, \ldots, V\}$ of feature array $c=f_V(v) \in \mathbb{R}^{V \times d}$ into the index of its closest visual code in $E_V$. Given a multimodal training set $\mathcal{D} = \{(x, v, y)\}$ wherein x, y denote source and target sentences, the image encoder $f_V$ is trained on a collection of images $\{v\}$ by optimizing a combination of reconstruction loss, vector quantization loss, and generative adversarial network (GAN) loss.

Once $f_V$ is learned, MMT feature aggregation can be carried out by extending the input sequence of source tokens x to the translation transformer $f_T$ with z encoded by concatenating the word/visual embeddings.

During inference, when visual inputs are not available, one or more embodiments include relying on a visual representation generation module $f_H$ to predict discrete visual tokens z given input text x. Such an embodiment includes implementing an autoregressive transformer that models the concatenation of text and image tokens as:

$$p(x, z; f_H) = p(x; f_H) p(z|x; f_H) = \prod_{i=1}^{S} f_H(x_i|x_{<i}) \prod_{j=1}^{V} f_H(z_j|z_{<j}, x)$$

The autoregressive transformer is trained to maximize the joint likelihood of x and z by optimizing the cross-entropy visual representation loss as follows:

$$\ell_H(f_H) = \mathbb{E}_{(x,y)}[-\log p(x, z; f_H)]$$

Such an embodiment includes modeling the joint $p(x, z; f_H)$ and not just the conditional $p(z|x; f_H)$. The generated visual sequence $\hat{z}$ is then defined as the most likely token predicted by $f_H$ at each time step i as follows:

$$\hat{z}_i = \arg\max_{k \in \{1, \ldots, K\}} f_H(z_i = k|z_{<i}, x)$$

wherein the conditioning $z_{<i}$ is replaced with generated visual sequence $\hat{z}_{<i}$ at inference time. While this enables the autoregressive transformer to perform autoregressive decoding using source text tokens x only, it creates a mismatch between the training and inference, which is reflected in the output of the multimodal translation transformer. To reduce this mismatch, one or more embodiments include defining a consistency loss as follows:

$$\ell_C(f_H, f_T) = \mathbb{E}_{(x,z,y)}\left[\sum_{i=1}^{T} KL[y_i^M \| y_i^H]\right]$$

wherein $y_i^M = p(y_i|x, z, y_{<i}; f_T)$ and $y_i^H = p(y_i|x, \hat{z}, y_{<i}; f_T)$ are the next word distributions from ground truth visual tokens and generated visual representation features, respectively, and $KL[y_i^M \| y_i^H]$ is the Kullback-Leibler divergence between the two conditional distributions.

Additionally, at least one embodiment includes addressing the arg-max operator at the output of a generated visual representation module preventing loss gradients from backpropagating through $f_H$ by using the Gumbel-Softmax relaxation during training, as follows:

$$\hat{z}_i = \sum_{k=1}^{K} \frac{\exp((\log \pi_{i,k} + g_k)/\tau)}{\sum_l \exp((\log \pi_{i,l} + g_l)/\tau)} o_k$$

wherein $\tau$ is the temperature of the Softmax and $o_k$ is a one-hot vector of length K activated at dimension k, $g_1, \ldots, g_K$ are sampled from a standard Gumbel distribution, and $$\pi_{i,k} = f_H(z_i = k|z_{<i}, x)$$

One or more embodiments can include setting $\tau=5$ as initial value and gradually annealing the value down to 0 during training, such that a one-hot distribution is implemented at inference.

Additionally, in at least one embodiment, an overall optimization objective is defined as a weighted sum of translation loss, generated visual representation loss, and consistency loss, as follows:

$$\ell_{(f_H, f_T)} = \ell_{(f_T; z)} + \ell_{(f_T; \hat{z})} + \gamma_H \ell_H(f_H) + \lambda_C \ell_C(f_H, f_T)$$

wherein $\gamma_H$ is a hyperparameter that controls the tradeoff between the visual representation module $f_H$ recovering ground truth visual tokens ($\gamma_H \to \infty$) and extracting semantic information useful for machine translation ($\gamma_H \to 0$), and $\lambda_C$ controls the degree of consistency between translation outputs.

Further, at least one embodiment includes implementing a version of a latent variable MT wherein $z=[z_1, \ldots, z_V]$ are discrete latent variables that are grounded (i.e., imbued meaning) by being trained against ground truth values of z obtained from real images.

Figure 3:
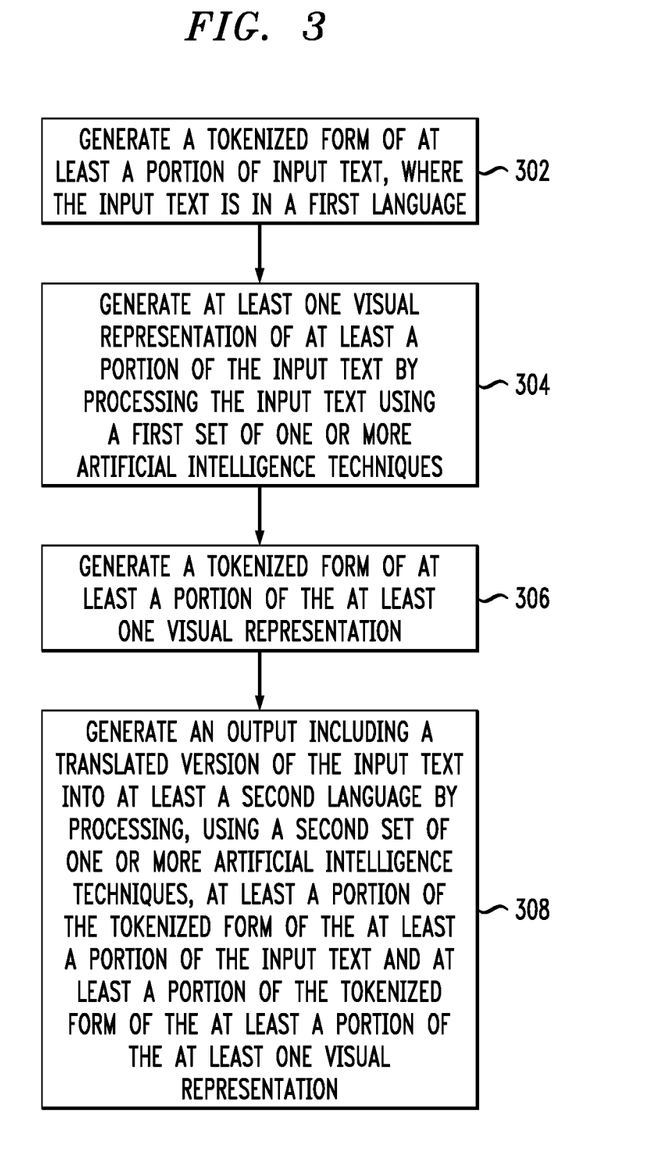
FIG. 3 is a flow diagram illustrating techniques according to an example embodiment of the invention.

FIG. 3 is a flow diagram illustrating techniques according to an embodiment of the present invention. Step 302 includes generating a tokenized form of at least a portion of input text, wherein the input text is in a first language. Step 304 includes generating at least one visual representation of at least a portion of the input text by processing the input text using a first set of one or more artificial intelligence techniques. In at least one embodiment, the first set of one or more artificial intelligence techniques includes at least one neural network-based autoregressive transformer.

Step 306 includes generating a tokenized form of at least a portion of the at least one visual representation. Step 308 includes generating an output including a translated version of the input text into at least a second language by processing, using a second set of one or more artificial intelligence techniques, at least a portion of the tokenized form of the at least a portion of the input text and at least a portion of the tokenized form of the at least a portion of the at least one visual representation. In at least one embodiment, the second set of one or more artificial intelligence techniques includes at least one neural network-based multimodal translation transformer. Also, in one or more embodiments, generating the output includes mapping, using the second set of one or more artificial intelligence techniques, one or more portions of the tokenized form of at least a portion of input text to one or more portions of the tokenized form of at least a portion of the at least one visual representation.

The techniques depicted in FIG. 3 can also include automatically training the first set of one or more artificial intelligence techniques by processing a training set of text data and processing image data corresponding to the training set of text data. In such an embodiment, processing image data corresponding to the training set of text data includes processing the image data using at least one neural network-based visual encoder. Additionally, in such an embodiment, automatically training the first set of one or more artificial intelligence techniques includes using visual representation loss-related techniques.

Further, such an embodiment can include automatically training the second set of one or more artificial intelligence techniques using (i) a tokenized combination of a visual representation of the training set of text data and the training set of text data, and (ii) a tokenized combination of the image data and the training set of text data. Also, in one or more embodiments, automatically training the second set of one or more artificial intelligence techniques includes using translation loss-related techniques and consistency loss-related techniques.

In at least one embodiment, the techniques depicted in FIG. 3 can include automatically training at least one of the first set of one or more artificial intelligence techniques and the second set of one or more artificial intelligence techniques using feedback related to the generated output.

Additionally, in one or more embodiments, software implementing the techniques depicted in FIG. 3 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
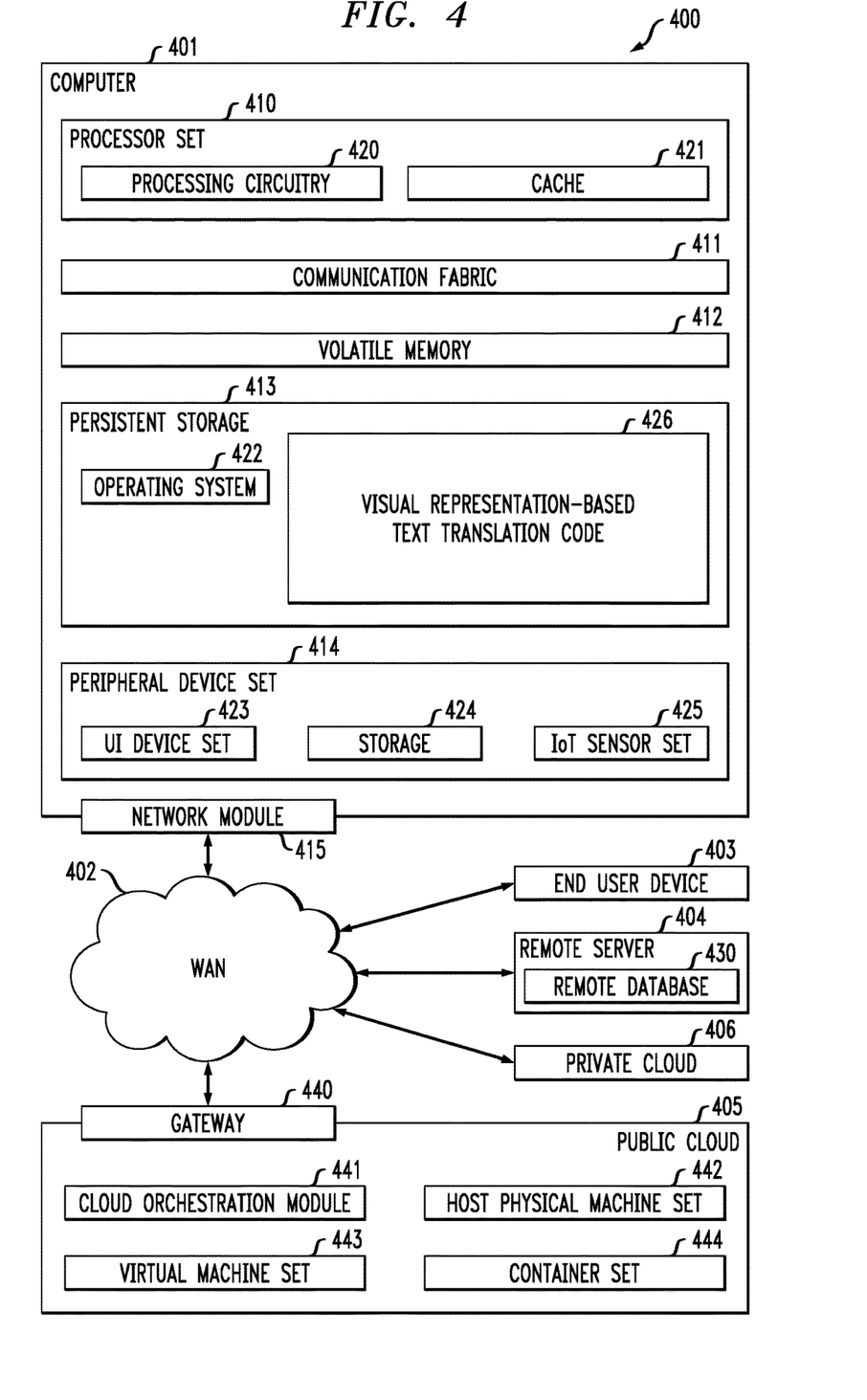
FIG. 4 is a diagram illustrating a computing environment in which at least one embodiment of the invention can be implemented.

Computing environment 400 contains an example of an environment for the execution of at least some of the computer code involved in performing the inventive methods, such as visual representation-based text translation code 426. In addition to code 426, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and code 426, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code 426 in persistent storage 413.

Communication fabric 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type RAM or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a ROM, but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in code 426 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating a tokenized form of at least a portion of input text; wherein the input text is in a first language;
generating, as output from utilizing a first set of one or more artificial intelligence techniques, at least one image representation of at least a portion of the input text by mapping portions of stored image data, the portions of the stored image data selected in connection with processing the input text using the first set of one or more artificial intelligence techniques, into portions of the at least one image representation of the at least a portion of the input text, wherein the first set of one or more artificial intelligence techniques comprises at least one neural network-based autoregressive transformer trained on the stored image data;
generating a tokenized form of at least a portion of the at least one image representation;
generating an output comprising a translated version of the input text into at least a second language by processing, using a second set of one or more artificial intelligence techniques, at least a portion of the tokenized form of the at least a portion of the input text and at least a portion of the tokenized form of the at least a portion of the at least one image representation, wherein the second set of one or more artificial intelligence techniques comprises at least one neural network-based multimodal translation transformer;
automatically training, using feedback related to the generated output, at least one of the at least one neural network-based autoregressive transformer and the at least one neural network- based multimodal translation transformer; and
automatically executing, subsequent to the automatic training, one or more machine translation operations using the at least one of the at least one neural network-based autoregressive transformer and the at least one neural network-based multimodal translation transformer;
wherein the method is carried out by at least one computing device.

2. The computer-implemented method of claim 1, further comprising:
automatically training the first set of one or more artificial intelligence techniques by processing a training set of text data and processing image data corresponding to the training set of text data.

3. The computer-implemented method of claim 2, wherein automatically training the first set of one or more artificial intelligence techniques comprises using visual representation loss-related techniques.

4. The computer-implemented method of claim 2, further comprising:
automatically training the second set of one or more artificial intelligence techniques using (i) a tokenized combination of a visual representation of the training set of text data and the training set of text data, and (ii) a tokenized combination of the image data and the training set of text data.

5. The computer-implemented method of claim 4, wherein automatically training the second set of one or more artificial intelligence techniques comprises using translation loss-related techniques and consistency loss-related techniques.

6. The computer-implemented method of claim 1, wherein generating the output comprises mapping, using the second set of one or more artificial intelligence techniques, one or more portions of the tokenized form of at least a portion of input text to one or more portions of the tokenized form of at least a portion of the at least one image representation.

7. The computer-implemented method of claim 1, wherein software implementing the method is provided as a service in a cloud environment.

8. A computer program product comprising a computer readable storage medium having program instructions embodied therewith, the program instructions executable by a computing device to cause the computing device to:
generate a tokenized form of at least a portion of input text, wherein the input text is in a first language;
generate, as output from utilizing a first set of one or more artificial intelligence techniques, at least one image representation of at least a portion of the input text by mapping portions of stored image data, the portions of the stored image data selected in connection with processing the input text using the first set of one or more artificial intelligence techniques, into portions of the at least one image representation of the at least a portion of the input text, wherein the first set of one or more artificial intelligence techniques comprises at least one neural network-based autoregressive transformer trained on the stored image data;
generate a tokenized form of at least a portion of the at least one image representation;
generate an output comprising a translated version of the input text into at least a second language by processing, using a second set of one or more artificial intelligence techniques, at least a portion of the tokenized form of the at least a portion of the input text and at least a portion of the tokenized form of the at least a portion of the at least one image representation, wherein the second set of one or more artificial intelligence techniques comprises at least one neural network-based multimodal translation transformer;
automatically train, using feedback related to the generated output, at least one of the at least one neural network-based autoregressive transformer and the at least one neural network- based multimodal translation transformer; and
automatically execute, subsequent to the automatic training, one or more machine translation operations using the at least one of the at least one neural network-based autoregressive transformer and the at least one neural network-based multimodal translation transformer.

9. The computer program product of claim 8, wherein the program instructions is further executable by the computing device to cause the computing device to:
automatically train the first set of one or more artificial intelligence techniques by processing a training set of text data and processing image data corresponding to the training set of text data.

10. The computer program product of claim 9, wherein the program instructions is further executable by the computing device to cause the computing device to:
automatically train the second set of one or more artificial intelligence techniques using (i) a tokenized combination of a visual representation of the training set of text data and the training set of text data, and (ii) a tokenized combination of the image data and the training set of text data.

11. The computer program product of claim 9, wherein automatically training the first set of one or more artificial intelligence techniques comprises using visual representation loss-related techniques.

12. The computer program product of claim 10, wherein automatically training the second set of one or more artificial intelligence techniques comprises using translation loss-related techniques and consistency loss-related techniques.

13. The computer program product of claim 8, wherein generating the output comprises mapping, using the second set of one or more artificial intelligence techniques, one or more portions of the tokenized form of at least a portion of input text to one or more portions of the tokenized form of at least a portion of the at least one image representation.

14. A system comprising:
a memory configured to store program instructions; and
a processor operatively coupled to the memory to execute the program instructions to:
generate a tokenized form of at least a portion of input text, wherein the input text is in a first language;
generate, as output from utilizing a first set of one or more artificial intelligence techniques, at least one image representation of at least a portion of the input text by mapping portions of stored image data, the portions of the stored image data selected in connection with processing the input text using the first set of one or more artificial intelligence techniques, into portions of the at least one image representation of the at least a portion of the input text, wherein the first set of one or more artificial intelligence techniques comprises at least one neural network-based autoregressive transformer trained on the stored image data;
generate a tokenized form of at least a portion of the at least one image representation;
generate an output comprising a translated version of the input text into at least a second language by processing, using a second set of one or more artificial intelligence techniques, at least a portion of the tokenized form of the at least a portion of the input text and at least a portion of the tokenized form of the at least a portion of the at least one image representation, wherein the second set of one or more artificial intelligence techniques comprises at least one neural network-based multimodal translation transformer automatically train, using feedback related to the generated output, at least one of the at least one neural network-based autoregressive transformer and the at least one neural network-based multimodal translation transformer; and
automatically execute, subsequent to the automatic training, one or more machine translation operations using the at least one of the at least one neural network-based autoregressive transformer and the at least one neural network-based multimodal translation transformer.

15. The system of claim 14, wherein the processor is further operatively coupled to the memory to execute the program instructions to:
automatically train the first set of one or more artificial intelligence techniques by processing a training set of text data and processing image data corresponding to the training set of text data.

16. The system of claim 15, wherein automatically training the first set of one or more artificial intelligence techniques comprises using visual representation loss-related techniques.

17. The system of claim 15, wherein the processor is further operatively coupled to the memory to execute the program instructions to:
automatically train the second set of one or more artificial intelligence techniques using (i) a tokenized combination of a visual representation of the training set of text data and the training set of text data, and (ii) a tokenized combination of the image data and the training set of text data.

18. The system of claim 17, wherein automatically training the second set of one or more artificial intelligence techniques comprises using translation loss-related techniques and consistency loss-related techniques.

19. The system of claim 14, wherein generating the output comprises mapping, using the second set of one or more artificial intelligence techniques, one or more portions of the tokenized form of at least a portion of input text to one or more portions of the tokenized form of at least a portion of the at least one image representation.

* * * * *